Patented Oct. 9, 1945

2,386,707

UNITED STATES PATENT OFFICE 2,386,707

RECLAIMING METHOD

Derwin V. Moore and Harry H. Thompson, Akron, Ohio, assignors to Wingfoot Corporation, Akron, Ohio, a corporation of Delaware No Drawing. Application March 18, 1942, Serial No. 435,140

3 Claims. (Cl. 260—36)

This invention relates to the reclaiming or regenerating of butadiene rubber-like products, such as butadiene copolymers, for example, copolymers with styrene and copolymers with acrylonitrile.

According to this invention, the vulcanized butadiene product is comminuted by known methods and then treated with a coal tar oil in the manner known in the art. This oil-treated material is plasticized with an aliphatic carboxylic acid or a monohydric aliphatic alcohol. A fatty acid may be used, for example acetic acid, citric acid, lauric acid, butyric acid or other aliphatic carboxylic acid such as benzoic acid. Methyl alcohol, ethyl alcohol, propyl alcohol, butyl alcohol, etc., may be employed.

The acid or alcohol may be added to the oil-material mixture while the copolymer is being cooked with the oil. As an alternative method, the acid or alcohol plasticizer may be added after the usual step of heating the material with oil. For instance, the plasticizer may be added while the oil-treated stock is being worked on a rubber mill. If preferred, a part of the plasticizer may be added to the oil-material mix and the balance on the mill.

The amount of acetic acid or ethyl alcohol or the like which is used will not normally be less than one-half percent and may be as much as five or ten percent. Normally five to eight percent will be employed.

For example, one hundred parts by weight of scrap pieces of cured copolymer of butadiene and styrene was cut to small particles and cooked with eighteen parts of coal tar oil. The oil used was the grade known as Type C "Picco" sold by Pennsylvania Industrial Chemical Company. However, there is nothing novel about the treatment of butadiene scrap with coal tar oils. Any suitable coal tar oil or mixture of coal tar oils may be used. In fact, the invention is not limited to treatment with coal tar oils as any method of softening or dissolving the scrap may be employed. After cooking for 8–10 hours at 350–385° F. the treated scrap was transferred to an apron mill. Here 5 parts of 90% acetic acid or ethyl alcohol were added. After the usual working the material was sheeted off. Up to 10% of acid or alcohol may be added on a mill, depending upon the degree of elasticity desired. If an alkaline stock is desired, liquid or dry alkali may be worked into the mass on the mill without destroying the elasticity gained by the action of the acid. After milling the mass was subjected to the usual reclaiming processes of refining, straining and slabbing. The resulting regenerated product could be recured to produce an oil-resistant material.

We claim:

1. The method of regenerating a rubber-like cured butadiene copolymer of the class produced with styrene and with acrylonitrile which comprises cooking the same with a swelling agent which contains ethyl alcohol as a plasticizer.

2. The method of regenerating a rubber-like cured butadiene copolymer of the class produced with styrene and with acrylonitrile which comprises working ethyl alcohol into the butadiene copolymer which has been swelled by a treatment with a swelling agent.

3. The method of regenerating a rubber-like cured butadiene copolymer of the class produced with styrene and with acrylonitrile which comprises boiling the same with a swelling agent containing ethyl alcohol, thereafter subjecting the swelled material to milling and adding further ethyl alcohol during the milling.

DERWIN V. MOORE.
HARRY H. THOMPSON.